United States Patent Office 3,392,226
Patented July 9, 1968

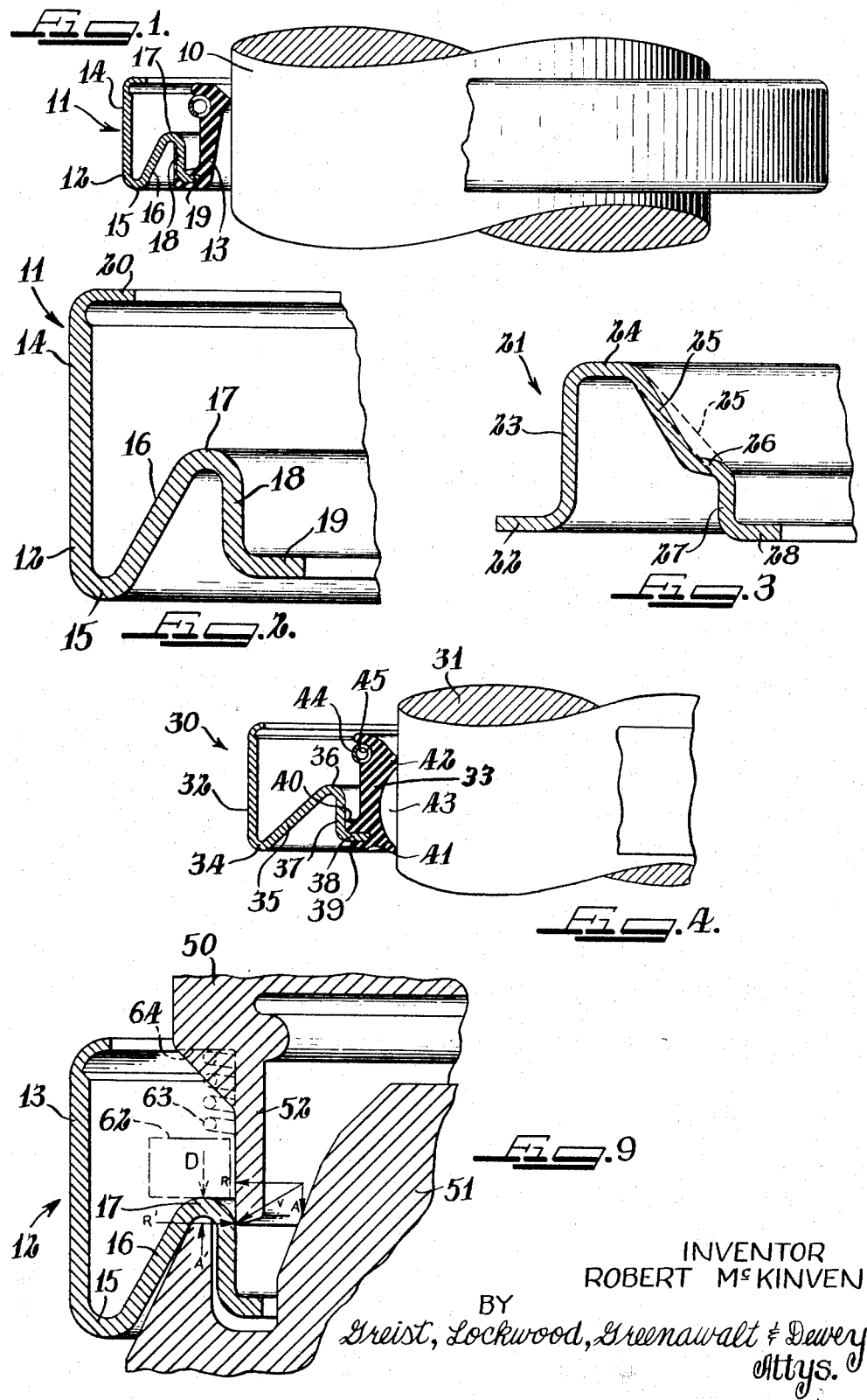

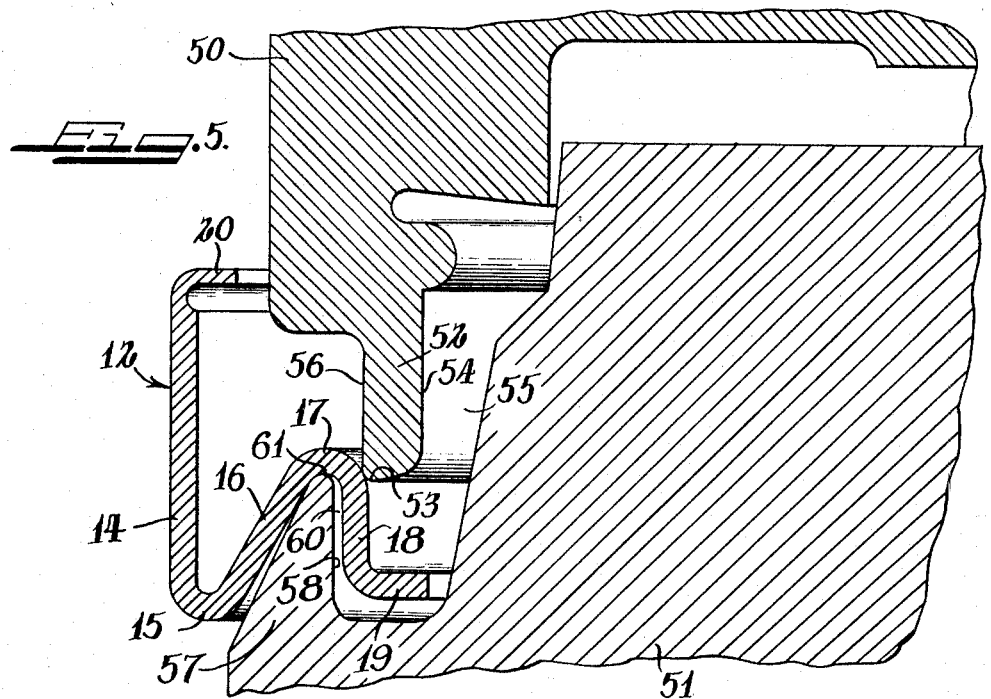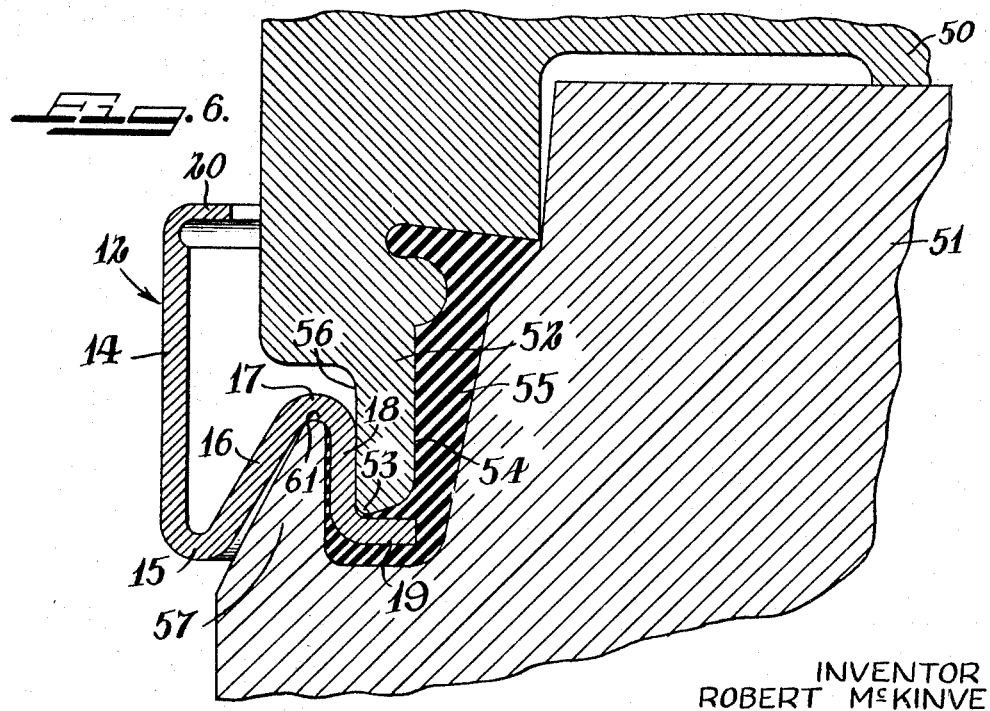

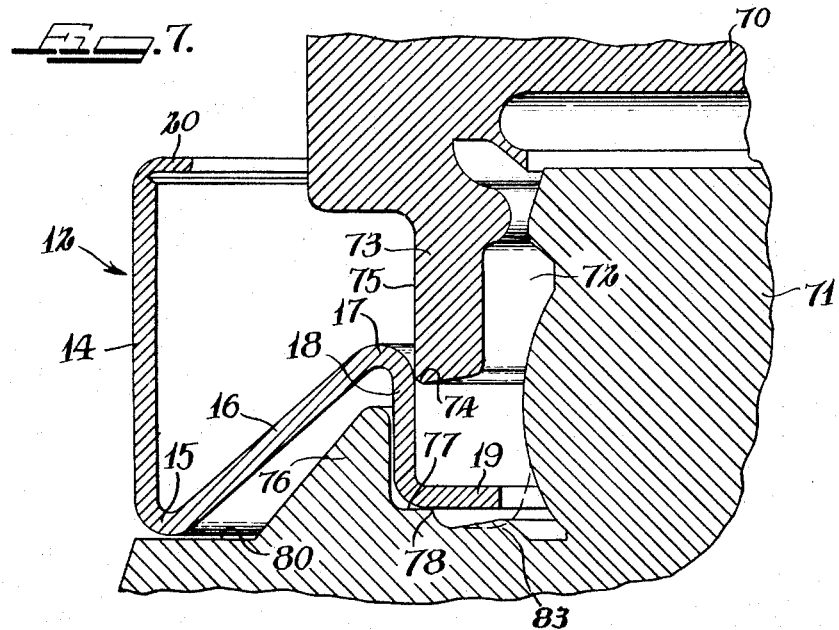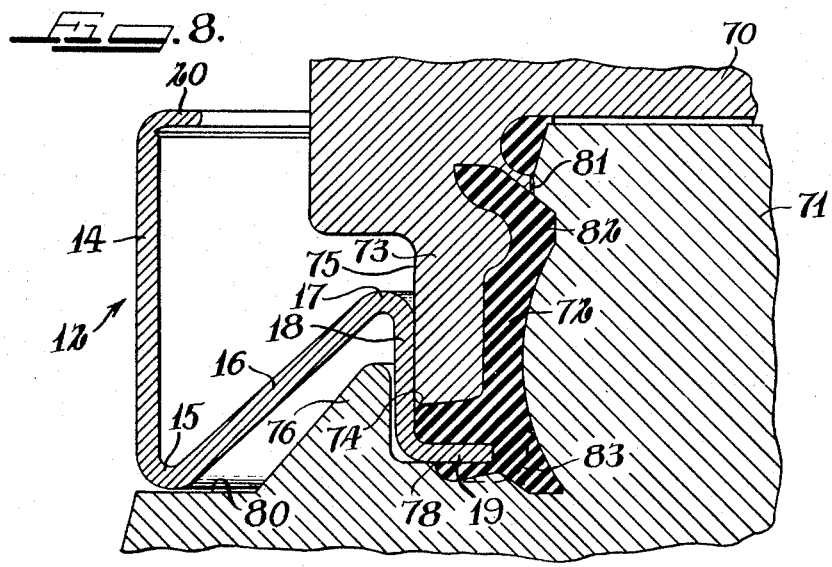

3,392,226
METHOD OF MANUFACTURING FLUID SEALS
Robert McKinven, Jr., Detroit, Mich., assignor to Chicago Rawhide Manufacturing Co., Chicago, Ill., a corporation of Illinois
Filed Oct. 5, 1964, Ser. No. 401,460
6 Claims. (Cl. 264—268)

ABSTRACT OF THE DISCLOSURE

A method of flash free molding of a flexible sealing element to an annular metal casing. Both flash barriers are established at the initial stage of mold closure with one of the flash barriers being movable and remaining effective over substantial mold travel so that the flash barriers are fully established before substantial movement of the charge of mold material. The resistance of the annular metal stamping to radial expansion co-operates with the mold to form the movable flash barrier while the other flash barrier is formed by the other mold half contacting the stamping along an annular pattern.

---

This invention relates to improvements in the method of manufacturing fluid seals. More specifically, the present invention concerns a novel method of uniquely constructing a novel shaft seal for accurate manufacture through the employment of a unique molding arrangement and flash free method of manufacture which minimizes the manufacturing costs.

Flashless compression molding techniques in the manufacture of shaft seals in and of themselves are not new to the trade. In fact, flashless molding of shaft seals has received notable acceptance in the industry because it affords several rather remarkable advantages. In particular, the cut-off lines between the mold material and the shaft seal casing are sharply defined without the necessity of cleaning flash, thus presenting a much neater looking finished product at a reduced cost. In addition, a reduction in the total mold material required is effected while the bonding of the mold material to the casing is enhanced by the flashless molding process. These are probably the more commendable aspects of present flashless molding techniques.

Notwithstanding the favorable aspects attributable to the flashless compression molding techniques present known, they are not completely free of certain shortcomings. To a considerable extent, the successful operation of flashless molding techniques presently practiced requires the establishment of mold barriers at the margins of the sheet metal stamping through forces generated by the mold halves as they exert a reforming or bending action on the sheet metal stamping or casing. If the reforming or bending action is of appreciable magnitude, there is a good chance that the opposite margin of the stamping will be distorted beyond acceptable tolerances with the obvious impairment of the fit when the seal is installed. As the mold pressures increase, the severity of the bending action or reforming action also must, of necessity, increase to establish effective flash barriers. Assuming that the reforming or bending is kept within reasonable limits, so that distortion of the stamping remains within acceptable tolerances, additional problems arise in that the timing of the mold must be fairly precise so that the mold contact points on the stamping are well established before the mold material completely fills the cavity shaped into a sealing element or lip. The total amount of bending action is, of necessity, limited which requires precise control over the timing of the mold. This is ordinarily accomplished by utilizing an uncured washer or disc placed outside the mold cavity proper and forced in the cavity in a manner which results in the cavity being completely filled after contact between the mold halves and the sheet metal stamping or casing has been made.

Still another perplexing problem arises from present day techniques, mainly residing in obtaining proper centering of the sheet metal stamping to obtain the requisite concentricity between the outer and inner periphery. In some instances, it has been necessary in the past to require the restraining rings and/or spring loaded centering devices to maintain the stamping properly positioned relative to the central axis of the mold until such time that mold contact was established. The undesirability of such necessity is self-evident.

Other problems which are somewhat ancillary in nature to those set out above, exist in present day techniques all of which have been of some concern to the trade. These problems with the solution proposed by the present invention will become more apparent when a general description of the present device with attendant advantages of the constructional features and molding techniques are considered.

The present shaft seal design is particularly suited to universal molding as well as automated manufacture since it requires a minimum of critical controls. Concentricity during the initial location of the sheet metal stamping is virtually assured and once placed in the mold, the stamping has little or no tendency to move out of position. Reforming of the stamping to any great degree is substantially eliminated. Any distortion on the sheet metal stamping is virtually limited to a radial re-sizing which merely serves to establish a mold barrier without effecting the specified blueprint dimensions of the seal at critical points.

The novel manner of molding together with the unique design permits the mold barriers to be established for a substantially long increment of mold travel to eliminate the need for precise loading and timing of the mold. The resultant effect on cost of manufacture is obvious. The more specific advantages and benefits derived from the unique seal design will become apparent upon a consideration of the objects achieved together with a detailed description of the unique seal design and molding technique both of which follow.

It is an object of this invention to provide a novel method of manufacturing shaft seals including a method of flash free attachment of a sealing lip element to a foot portion of a convoluted casing.

It is a further object of this invention to provide a unique method of molding an elastomeric sealing lip to a metallic stamping or casing in a flash free manner which method avoids undesirable distortion of the stamping or casing during the flash free molding process.

It is a still further object of this invention to provide a new and improved molding technique to enable the manufacture of flash free shaft seals in a simple and inexpensive manner while providing an adequate mounting area between the metal and elastomeric material forming the sealing lip.

Further and fuller objects will become readily apparent when reference is made to the accompanying drawings wherein:

FIG. 1 is an enlarged side elevational view of a fragmentary portion of a shaft accommodating the shaft seal of the present invention, one half of the shaft seal being illustrated in cross section;

FIG. 2 is an enlarged fragmentary cross sectional view of the casing of FIG. 1;

FIG. 3 is an enlarged cross sectional view of a modified form of casing;

FIG. 4 is a fragmentary half section of a modified form of shaft seal similar to that shown in FIG. 1;

FIG. 5 is an enlarged half section of a mold with the mold halves at initial contact with an annular seal casing also shown in cross section;

FIG. 6 illustrates the mold of FIG. 5 in the closed or final position demonstrating the shape of the finished sealing lip;

FIG. 7 is a view similar to FIG. 5 illustrating a modified form of mold arrangement at the position of initial contact with the annular casing;

FIG. 8 is a view similar to FIG. 6 illustrating the mold halves of FIG. 7 in the closed or final position and dotted lines to illustrate a modified form of lip construction; and FIG. 9 is a fragmentary view of a mold similar to that of FIGS. 5–8 vectorially illustrating the forces at initial contact, and dotted lines to illustrate a modified form of force supplementing means acting on the annular casing to assist in establishing the outer mold barrier.

Referring now to FIG. 1, a shaft 10 is shown fragmentarily which mounts a seal indicated by the reference 11 and including annular seal forming elements 12 and 13. As seen in the cross sectional view of FIG. 2, the element 12 comprises an annular sheet metal casing having an outer wall 14 of cylindrical configuration which arcuately merges as at 15 into a frusto-conical section 16 which projects radially inward. The frusto-conical section 16 curls reversely at hinge or inverted trough forming point 17 into an axially extending barrel portion 18 which curls into a radially inwardly directed foot portion 19.

The annular sealing element 13 is bonded to and covers the foot 19, with the bond terminating adjacent the intersection of the barrel 18 and the foot 19 on the inner periphery to form a bond portion. The mold material completely engulfs the foot 19 on the opposite side completely covering the outer periphery of the barrel 18 stopping at a clean sharp line on the hinge point 17. The mounting arrangement shown in FIG. 1 provides excellent concentricity between the inner and outer diameters while permitting good flexing action of the lip as will become apparent when a full description is given. The shape of the annular casing 12 permits a thinner gauge of sheet metal to be used in fabrication without a loss of strength since it is convoluted to provide an extremely rigid construction for disposition across a radial bore between a machine housing and a shaft or the like. Additional rigidity may be provided by forming an inturned flange 20 on the axial end portion of the outer periphery. Obviously, the flange 20 may also be used to retain an inner cup, or the like for lip protection, spring retention and the like.

A modified form of metal casing 12 is illustrated in FIG. 3 at 21 including an outer flange 22 which merges with a generally cylindrical portion 23. A radial section 24 joins a frusto-conical section 25 to the cylindrical section 23. A generally radial section 26 joins a generally cylindrical section 27 which curls into the radial extending foot portion 28 serving an analogous function to the barrel and foot portion 18 and 19 of the embodiment of FIG. 1. If desired, the frusto-conical section may assume the configuration shown in dotted lines at 25' to omit radial section 26.

Referring now to FIG. 4, a modified form of shaft seal is indicated generally by reference numeral 30 being disposed about a rotary or reciprocable shaft 31, the latter being shown fragmentarily. The seal 30 includes an annular casing 32 and associated sealing element 33 which in the present design is illustrated as a double lip construction. The annular casing 32 is formed of sheet metal and includes an outer annular wall 32 curling about a hinge point 34 into an inwardly directed generally frusto-conical section 35 which curls at 36 into an axially extending barrel portion 37. A radially extending foot portion 38 is formed at the opposite end of the barrel portion 37 and serves as the mounting for a sealing lip element 33. The casing construction is like that shown in FIGS. 1 and 2, however, one of cut-off lines on the sealing lip 33 is shifted in order to utilize the hydraulic pressure of the mold material to assist in maintaining an effective barrier.

The attached sealing element 33 terminates in a sharp cut-off line 39 on one side of the foot 38 while the other cut-off line 40 on the inside of the foot is formed on the same diameter as the counterpart cut-off line shown in the embodiment of FIG. 1.

The sealing element 33 includes lip portions 41 and 42 defined by an annular radially opening groove 43 therebetween. The sealing lip 42 is biased into engagement with the shaft 31 through a garter spring 44 received in an annular groove 45 positioned over the lip 42. The other sealing lip 41 is also formed at molding and serves as an exclusionary lip to keep dust away from the primary fluid sealing lip 42.

As pointed out above, flashless molding of oils seals to date has been achieved by forming mold barriers through a bending action on the casing around the margins of the central opening or hole in the stamping. The amount of bending or reforming required is of necessity small in order to refrain from distorting the stamping out of tolerance. As expected, the contact between the mold and stamping is of relatively short duration or in effect over a very short increment of mold travel. Accordingly, the timing of the mold must be precise in order that the mold barriers are fully established before the cavity is completely filled. Such timing requires precise control to be exercised over the process with the obvious reflectance in the cost of the finished product.

The seal embodiment of FIGS. 1–3 eliminates the need for such precise controls. Bending to establish barriers, and precise timing control are effectively eliminated by the present design. This will become more apparent on description of FIGS. 5 and 6.

An enlarged fragmentary half section of a two-piece mold arrangement is illustrated in FIGS. 5 and 6 including an upper mold half 50 and lower mold half 51. FIG. 5 shows the mold halves at the position of initial contact with the stamping or annular metallic casing 12 while FIG. 6 shows the mold positions at the completion of mold travel. The upper mold half 50 includes an axially extending land 52 having an apical zone 53 at the outer periphery generally in the region of contact with the casing or stamping 12.

The inside diameter 54 of the land 52 is suitably shaped so as to form a sealing lip cavity 55 to shape the outer peripheral portion of the sealing element 13 at molding. The outer diameter 56 of the land 52 is slightly greater than the inside diameter of the barrel 18 on the annular metal casing 12 for reasons to become apparent.

A back-up ring 57 is formed in the outer margin of the lower mold 51, being of a generally frusto-conical design on the exterior having an inside diameter portion 58 generally in the shape of a right circular cylinder. The inside diameter of the cylindrical portion 58 of the back-up ring 57 is slightly greater than the outside diameter of the barrel portion 18 to establish a small clearance as indicated at 60.

An apical zone 61 is formed on the back-up ring 57 for good mold contact along the inside radius of the hinge portion 17 on the casing 13, which as noted above, forms the transition between the frusto-conical section 16 and barrel 18. It is contemplated that the apical zone 61 will be on a radius identical to or somewhat less than the radius of the stamping and in some instances the apical zone 61 may comprise a relatively sharp edge or the like, with identical radiuses being preferred.

It is contemplated that the clearance 60 will be slightly greater than the maximum differential between the outside diameter 56 of the land 52 and the inside diameter of the barrel 18. Accordingly, sufficient radial clearance is provided for annular growth as the apical zone 53 on the annular land 52 enters the barrel portion 18. The over-all radius of the back-up ring 57 is generally the same shape and size as the annular wedge formed by the barrel 18 and frusto-conical portion 16 of the stamping, however, the frusto-conical exterior portion on the back-up ring is tapered more sharply away from the apical zone 61 to insure that the stamping is located on and supported by the apical zone 61 for establishing an external flash barrier as will become apparent hereinafter.

As the land of the upper mold enters the inside of the barrel 18 of the stamping 12, it is resisted by a force, the components of which are more clearly seen in the diagram of FIG. 9 being represented schematically by the conventional vector and horizontal and vertical components. The reaction forces formed to maintain equilibrium in the system serve to form the flash barriers at each of the apical zones 53 and 61. The vertical or axial force on the upper mold 50 as indicated by the reference A tends to move the stamping downwardly into engagement with the lower mold half 51, generating a reacting force at A'. A radial force R is generated as the outside diameter 56 of the land 52 enters the barrel which gives rise to a resisting force indicated at R' in FIG. 9.

The downward or axial force A may be supplemented by an additional force D shown in phantom which is developed by a resiliently urged back-up ring 62 also shown in phantom. Downward bias is provided by means of a spring 63 which is bottomed against a shoulder 64 formed in the top mold in the configuration shown in phantom. It is contemplated that the contacting shoulder may be formed integral with the mold half 50 for contact with the casing 13 only at the final stage of mold travel, if desired. The spring biased ring arrangement is preferred, however, since the total force D increases as the mold 50 moves towards final contact with the lower mold half 51.

At final travel of the mold, the charge of mold material which may be placed in any form or shape between the mold halves, is forced downwardly into the mold cavity 55 assuming the final configuration shown in FIG. 6. As previously pointed out, the flash barriers are established on the casing 13 by the apical zone 61 and the tangential component of the apical zone 53 which of course may be coincidential with the outer side of the diameter 56 of the land 52.

At this point it can be readily appreciated that the barriers resisting the escape of the elastomeric mold material have been in force and effect for a substantial increment of mold travel. It is equally obvious on inspection of FIGS. 5 and 6 that the duration of mold travel may be varied by varying the axial dimension of the barrel 18.

Throughout the movement of the upper mold half 50, the barrel 18 is stretched radially causing it to act as an elastic band to form the inner mold barriers noted. At the final position as shown in FIG. 6, the mold halves 50 and 51 are in contact with each other which serves to prevent further travel. The importance of contact of the mold halves is that no reliance is placed on the thickness of the stamping element to control the total mold travel and accordingly no variation is experienced from one seal to the next due to non-uniformity in thickness of the stamping 12.

Centering of the stamping 12 is accomplished through the unique shape of the stamping in that the hinge section 17 between the frusto-conical portion 16 and barrel 18 serves to center the stamping on the lower mold half in such a fashion that cocking is virtually eliminated. In addition, no control over the inside diameter or pierced diameter on the foot is necessary since it does not serve a centering function as is the case in some designs. The design enhances the capability of producing shaft seals well within established tolerances and accepted limits of concentricity.

A modified form of molding arrangement is illustrated in the fragmentary half sections of FIGS. 7 and 8. FIG. 7 shows the mold halves at the position of initial contact while FIG. 8 demonstrates the position assumed by the mold halves when in the completely closed position. An upper mold half 70 co-operates with a lower mold half 71 in a manner generally similar to that described in conjunction with FIGS. 5 and 6. In the embodiment of FIG. 7, however, the mold cavity 72 has the parting line between the mold halves arranged so as to provide a self-trimmed sealing lip. Also, the lower flash barrier is positioned inwardly of the barrel 18 as will be described.

An axially extending annular land 73 is provided with an apical zone 54 at its lower and outer marginal edge for contact with a stamping 12. The outside diameter 75 of the annular land 73 is slightly greater than the inside diameter of the barrel portion 18 of the annular metal stamping or casing 12. The lower mold half is provided with a centering ring 76 which is of reduced height relative to the barrel portion 18 so that it does not contact the same at the hinge point in the manner described in connection with FIGS. 5 and 6.

An annular flat ridge 77 is provided inwardly of the centering ring 76 and contacts the foot 19 intermediate the inner peripheral margin and the barrel 18. The line of contact is indicated at 78 and forms an annular flash barrier during the molding process.

An annular shoulder 80 is provided radially outwardly of the centering ring 76 and is disposed relative to the surface 77 so as to provide a slight clearance between the hinge point 15 on the stamping 12 and the surface 80 so that the stamping is freely movable for proper centering. The slight clearance guards against the possibility of the stamping becoming cocked in the lower mold half 71 while enhancing the ease of placement.

As the upper mold half 70 moves to the final position shown in FIG. 8, an annular flash groove is formed as at 81 which is tapered slightly towards the sealing lip to provide a thin wall which may be blown or easily torn away adjacent the annular lip 82 to eliminate lip trimming by means of a knife or the like. By shaping the lip 82 as shown in dotted lines at 83, a single lip seal may be readily manufactured.

With the cut-off line 78 formed inwardly of the cut-off line on the opposite side of the foot 19, the hydraulic force generated by the mold material operates over an increased area in the inside of the foot to assist the land 73 in exerting a downward force on the stamping to establish a good flash barrier at 78. The fluid pressure developed by the mold material in acting over the differential area on the inside of the foot 19 establishes a substantial force to assist in maintaining the flash barrier 78. The opposite or inside flash barrier is generated at 74 by the tensile forces in the barrel 18 of the stamping 17 as described above and are of sufficient magnitude to establish a sharp cut-off of the mold material.

It is to be appreciated from an examination of the molding arrangement shown in FIGS. 5–8 that the flash barriers will be well established over a rather substantial length of mold travel beginning at initial contact and lasting throughout the entire travel of the molds. Accordingly, the precise timing required in prior art arrangements is avoided. Obviously, the present mold arrangement is such that a stamping having any external configuration may be used, therefore universal seals for a given shaft size may be provided with a single set of molds.

After a consideration of the foregoing, it will become obvious to those skilled in the art that additional changes in construction and different embodiments of the invention will be suggested without departing from the spirit and scope of the invention as defined in the appended claims.

I claim:

1. A method of flash-free bonding a flexible sealing element to an annular seal casing without substantial dimensional alteration thereof, wherein said casing includes an outer mounting portion, an inwardly extending, generally frusto-conical offsetting portion, a hinge portion defining a downwardly facing trough portion, and a downwardly and very slightly inwardly extending, nearly cylindrical barrel portion having inner and outer surfaces and terminating in an inwardly extending foot member having top and bottom surfaces joined by an inner edge portion, said method comprising the steps of (a) supporting said casing member from the bottom thereof by a mold member which contacts said casing at, and forms a first flash barrier along, a surface thereof which is spaced radially substantially outwardly from said inner edge portion, said mold member providing a cavity beneath at least a portion of said bottom surface of said foot member for receiving molding material for forming said sealing element;

(b) engaging the upper portion of the inner surface of said barrel portion with the outer edge of an upper land portion of an upper mold member, thereby forming a flash barrier along said inner surface, said land and said upper mold member, in combination, defining a cavity disposed at least partly below and radially inwardly thereof;

(c) filling said cavities with said molding material in an incompletely cured state;

(d) moving said mold portions together, with said land portion contacting said inner surface while said lower mold member supports said casing, and continuing movement until said cavities define an annular sealing member of the desired cross-sectional shape; and (e) allowing said sealing material to cure to form a flexible sealing element bonded to said casing.

2. The method as defined in claim 1 in which said mold member which contacts said casing and supports it from below includes a lower land portion, and in which the surface of said casing engaged by said lower land portion of said mold member is said trough portion.

3. The process of claim 2 in which said upper land is moved substantially to the bottom of said inner surface of said barrel member, and whereby said seal member is attached to said outer surface of said barrel, to the top and bottom portions of said foot member, and to said inner edge portion of said foot portion.

4. The process of claim 1 in which said lower mold member contacts said foot adjacent the outer part of the bottom surface thereof, and in which said upper land is moved partially down along said inner wall, and whereby said seal member is adhered to the bottom, top, and inner edge surfaces of said foot member and to a substantial portion of said inner surface of said barrel member.

5. A method of flash-free bonding a flexible sealing element to an annular seal casing without substantial dimensional alteration thereof, wherein said casing includes an outer mounting portion, an inner barrel having a foot portion at the bottom thereof, said foot portion including top and bottom surfaces joined by an inner edge portion, and wherein said barrel portion is connected to said mounting portion by a flange forming a trough at the junction of said barrel portion and said flange portion, and wherein said barrel portion is substantially cylindrical, said method comprising the steps of (a) supporting said casing member from the bottom thereof by a mold member which contacts said casing at, and forms a first flash barrier along, at least a part of said bottom surface of said foot portion, said mold member providing a cavity extending at least partly radially inwardly from said bottom surface portion of said foot portion for receiving molding material for forming said sealing element;

(b) engaging the upper portion of the inner surface of said barrel portion with the outer edge of an upper land portion of an upper mold member, thereby forming a flash-barrier along said inner surface, said land and said upper mold member, in combination, defining a cavity disposed at least partly below and radially inwardly thereof;

(c) filling said cavities with said molding material in an incompletely cured state;

(d) moving said mold portions together, with said land portion contacting said inner surface while said lower mold member supports said casing, and continuing movement until said cavities define an annular sealing member of the desired cross-sectional shape; and (e) allowing said sealing material to cure to form a flexible sealing element bonded to said casing.

6. A method of flash-free bonding a flexible sealing element to an annular seal casing without substantial dimentional alteration thereof wheretin said casing includes an outer mounting portion, an inner, barrel portion having a foot portion at the bottom thereof, said foot portion having top and bottom surfaces joined by an inner edge portion, and wherein said barrel portion is connected to said mounting portion by a flange forming a trough at the junction of said barrel portion and said flange portion, and wherein said barrel portion is substantially cylindrical, said method comprising the steps of (a) supporting said casing member with a land portion of a lower mold member so that said land engages said trough, and forms a first flash-barrier therealong, said mold member providing a cavity beneath at least a portion of said bottom surface of said foot member for receiving molding material for forming said sealing element;

(b) engaging the upper portion of the inner surface of said barrel portion with the outer edge of an upper land portion of an upper mold member, thereby forming a flash barrier along said inner surface, said land and said upper mold member, in combination, defining a cavity disposed at least partly below and radially inwardly thereof;

(c) filling said cavities with said molding material in an incompletely cured state;

(d) moving said mold portions together, with said land portion contacting said inner surface while said lower mold member supports said casing, and continuing movement until said cavities define an annular sealing member of the desired cross-sectional shape; and (e) allowing said sealing material to cure to form a flexible sealing element bonded to said casing.

References Cited
UNITED STATES PATENTS

| | | | |
|---|---|---|---|
| 3,090,996 | 5/1963 | Reichenbach | 29—527 |
| 3,004,297 | 10/1961 | Stover | 264—268 |
| 3,276,115 | 10/1966 | Hansz | 264—268 |

ROBERT F. WHITE, *Primary Examiner.*

R. B. MOFFIT, J. H. SILBAUGH,
*Assistant Examiners.*